3,014,041
HETEROCYCLIC SUBSTITUTED COUMARIN COLOURS
Heinrich Häusermann and Jacques Voltz, Basel, Switzerland, assignors to J. R. Geigy A.-G., Basel, Switzerland
No Drawing. Filed June 15, 1959, Ser. No. 820,106
Claims priority, application Switzerland June 19, 1958
6 Claims. (Cl. 260—304)

It is an object of the present invention to provide new and useful coumarin derivatives. More particularly the object is to provide coumarin derivatives which are substituted in the 3-position by a nitrogen-containing unsaturated heteronucleus. These coumarin compounds show strong fluorescence in ultraviolet and in daylight and may be used to impart this property to substrata when applied to or incorporated therein. Depending on their self-colour which, according to the individual structure, varies from slightly yellowish to full yellow, the new coumarin derivatives may be used to impart either fluorescent properties to uncoloured or coloured polymeric and copolymeric material from olefines or to give them a yellow colouration of exceptional brilliance in daylight as will become apparent from the following description and examples.

It is a further object of the present invention to provide several methods of manufacture for the new heterocyclic substituted coumarin compounds as detailed below.

It is a further object of the present invention to provide new, stable, water soluble quaternary salts of coumarin derivatives which are substituted in the 3-position by an unsaturated cyclammonium ring. These stable salts may be used to dye polymeric and copolymeric acrylonitrile from aqueous dyebaths in yellow shades of exceptional brilliance.

It is a further object of the present invention to provide yellow dyed polymeric and copolymeric acrylonitrile of brilliant shades produced with salts of the new coumarin derivatives and especially with the quaternary cyclammonium salts.

Further objects will become apparent from the following description.

In its broadest aspect, the invention comprises arylopyrone compounds heterocyclically substituted in the 3-position, of the general Formula I

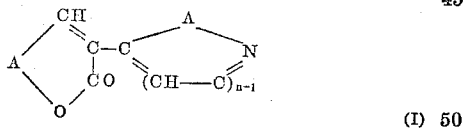

(I)

and the quaternary salts obtained therefrom. In this formula

A represents a bivalent carbocyclic aromatic radical consisting of at most two fused rings and bound at the adjacent ring carbon atoms where indicated in the formula,
X represents a bivalent radical which completes an unsaturated five- to six-membered ring, and
$n$ represents a whole number of at most 2.

A narrower class of compounds of especial interest corresponds to the general Formula II and to quaternary salts obtained therefrom:

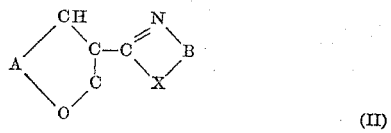

(II)

In this formula:
A and B each represents a bivalent carbocyclic aromatic radical consisting of at most two fused rings and bound where indicated in the formula at adjacent ring carbon atoms, and
X represents a bivalent bridging member selected from the group consisting of sulphur and imino groups.

In a group of preferred compounds possessing enhanced tinctorial strength, A represents an aminobenzo radical containing the amino group in m-position to the oxygen linkage, thus forming 3-heterocyclic substituted 7-aminocoumarins and quaternary salts thereof. Also B represents preferably a benzo radical.

In these preferred compounds the amino group of the benzo radical A may be primary, secondary or tertiary. Aliphatic, araliphatic, cycloaliphatic and aromatic radicals may be the N-substituents of the secondary or tertiary amino groups. In tertiary amino groups these N-substituents may be the same or different. Lower aliphatic substituted tertiary amino groups are preferred because the compounds containing them are more or less soluble in water as salts with the usual inorganic and organic acids and, due to this property, may be used for the dyeing of acrylic polymers in aqueous dyebaths. The N-substituents of these tertiary amino groups may be lower hydrocarbon groups such as, for example, methyl, ethyl, propyl, butyl groups, or substituted alkyl groups such as, for example, 2-hydroxyethyl, 2-hydroxypropyl, 2.3-dihydroxypropyl, 2-methoxyethyl, 2-ethoxyethyl, 2-cyanoethyl groups. Apart from one of these lower aliphatic substituents, an alicyclic radical such as cyclohexyl, an araliphatic radical such as benzyl or an aromatic radical such as phenyl or alkylphenyl may also be present in the tertiary amino group.

The arylo radicaals A and B may be substituted by inert substituents, for example, by halogen, lower alkyl, aralkyl, aryl, lower alkoxy, aryloxy, hydroxy, amino, acylamino, nitro, cyano, carboxylic and sulphonic acid ester and amido groups.

Much more stable and useful water soluble salts are obtained, however, if the compounds of the general Formulae I and II are reacted with esters of lower alcohols and of benzyl alcohols with strong inorganic or organic acids of the general Formula III $$Y-Z \qquad III$$

to form the quaternary cycloammonium salts which correspond to the general Formulae Ia and IIa:

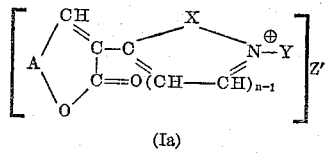

(Ia)

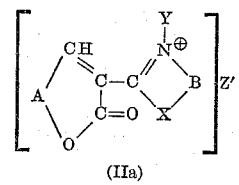

(IIa)

In these formulae,

Y means the organic radical of a lower aliphatic hydroxy compound or of a benzyl alcohol, for example methyl, ethyl, propyl, methoxyethyl, benzyl, methylbenzyl,
Z means the radical of a strong inorganic or organic acid such as the radical of hydrochloric, hydrobromic, hydroiodic, sulphuric acid, alkyl sulphonic acid esters, phenyl sulphonic and p-toluene sulphonic acid,
Z' means the corresponding anion or any equivalents thereof, for example, the anion of so-called double salts, for example, the double salts of zinc halides and cadmium halides with halogen ion, viz: $(ZnCl_3)'$ or $(CdCl_3)'$, and A, B, X and $n$ have the meanings indicated under Formulae I and II, and the preferences explained there apply here also.

The transformation of the new heterocyclic substituted coumarins into the corresponding cyclic ammonium salts (called herein cyclammonium salts) by alkylation or aralkylation, imparts sufficient water solubility and stability to allow dyeing to be performed from boiling acid dye baths. The anion Z', however, does not add anything in this connection; preferably it is a colourless anion. To some extent however, it does govern the solubility in water. In order to be able to balance the coloured cation, the anion Z' should not be the radical of a too weak acid; however, the ions of stronger organic acids such as oxalic acid, acetic acid, lactic acid, benzoic acid are also quite suitable.

The new 3-heterocyclic substituted coumarins are obtained by condensing an aromatic o-hydroxy or o-alkoxy aldehyde with a heterocyclic active methylene compound of the Formulae IV and V

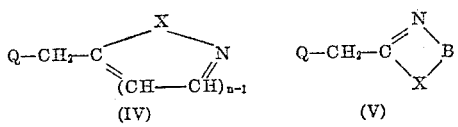

and then closing the ring. In these formulae X, B and $n$ have the same meaning as in the preceding formulae and Q represents a carboxylic group or, preferably, a transformed carboxylic group, i.e. a carbalkoxy, a carbamyl or a cyano group. The condensation is performed in an alkaline medium, but ring closure is preferably effected in an acid medium or melt, the acidity and temperature being so chosen as to effect splitting of the ether linkage if the condensation product of an o-alkoxy aldehyde is used. If Q is the cyano group, then rearrangement to the corresponding 2-iminocoumarin first occurs, which compound is hydrolyzed in hot acid aqueous solution to the desired 3-heterocyclic substituted coumarin.

o-Hydroxy and o-lower alkoxy aldehydes of the benzene and naphthalene series are preferably used as the starting material, for example: 2-hydroxy or 2-methoxy benzaldehyde, 3-, 4- or 5-methyl-2-hydroxybenzaldehyde, 3.5- or 3.6-dimethyl-2-hydroxybenzaldehyde, 5-tert. butyl-2-hydroxybenzaldehyde, 3-, 4- or 5-chloro- or bromo-2-hydroxybenzaldehyde, 3-chloro-5-methyl-2-hydroxybenzaldehyde, 4-hydroxy- or 4-methoxy-2-hydroxybenzaldehyde, 4-nitro-2-hydroxybenzaldehyde, 5-phenyl-2-hydroxybenzaldehyde, 4-ethylamino-2-methoxybenzaldehyde, 4-amino-, 4-dimethylamino-, 4-diethylamino-, 4-dibutylamino-, 4-dibenzylamino-, 4-N-methyl-N-phenylamino-2-hydroxybenzaldehyde, 5-(benztriazolyl-(2')-2-hydroxybenzaldehyde, 2-hydroxy-1-naphthaldehyde, 1-hydroxy-2-naphthaldehyde, 4-chloro-1-hydroxy-2-naphthaldehyde and 2.4-dihydroxy-1-naphthaldehyde.

The heterocyclic starting material contains preferably an aryloazole ring and corresponds to Formula V. However, active methylene derivatives of 6-membered unsaturated hetorcycles, such as pyridine and quinoline derivatives, containing the active methylene group in o- or p-position to a tertiary ring nitrogen atom may also be used. They correspond to Formula IV wherein $n=1$ and X is a butadienylene or an o-styrylene group if the active methylene group is in o-position to the ring nitrogen, and wherein $n=2$ and X is a vinylene or a benzo radical if the active methylene group occupies the p-position to the ring nitrogen.

The condensation of the heterocyclic components with the o-hydroxy or o-alkoxy aryl aldehyde is performed advantageously in the presence of inorganic or organic basic condensing agents such as, for example, potassium or sodium hydroxide, alkali alcoholates, pyridine or piperidine. The liberation of the hydroxyl group in condensation products from o-alkoxy aldehydes is performed advantageously with anhydrous aluminium chloride in an inert organic solvent in the aluminium chloride/sodium chloride melt or with pyridine hydrochloride. Often the pyrane ring is closed at the same time. If the latter is not the case or if an α-(azolyl- or azinyl)-β-(o-hydroxyaryl)-acrylic acid derivative is obtained as reaction product from the first step, than the ring is closed advantageously with a solution of halogen hydracid in a low fatty acid. Other acid condensing agents can be used however, for example, zinc chloride or aqueous mineral acids.

A further method for the production of the preferred 3-aryloazolyl-(2')-coumarins of the Formula II consists in reacting a coumarin compound of the Formula VI

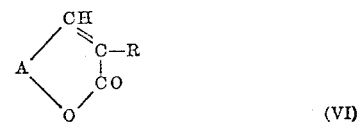

wherein

A has the same meaning as in the preceding formulae and R represents a carboxylic acid, a carboxylic acid halide, a carboxylic acid ester or a carbamyl group, with an aromatic amine which contains a thio group or a primary or secondary amino group in a position vicinal to the primary amino group.

5.6-arylo-2-pyrone compounds of the Formula VI are obtained from o-hydroxy or o-alkoxy aryl aldehydes by condensation with cyano acetic acid or malonic acid alkyl esters. In this modified process, 5.6-arylo-2-pyrone-3-carboxylic acid alkyl esters are the preferred components. These pyrone compounds are condensed with the o-substituted arylamines, as which in particular o-phenylene diamine, o-amino-N-alkyl anilines, o-aminothiophenol and nuclear substitution products thereof are used, advantageously by heating a mixture of the two components in an inert organic solvent having a higher boiling point to temperatures of over 120°.

The new 3-heterocyclic substituted 5.6-arylo-2-pyrone compounds of the general Formulae I and II are yellow to orange powders which dissolve in organic solvents such as alcohols, esters, ethers, ketones. In the form of their salts with strong mineral acids, some are also soluble in water. In ultraviolet light and in daylight, the organic solutions of these new compounds have a strong yellow-green to blue-green fluoresence. They can thus be used for improving the aspect of yellow-pigmented polymeric synthetic materials such as polyvinyl chloride, polyvinylidene chloride, polystyrene, or they can be used for the dyeing thereof in vivid yellow to orange shades by incorporating them into these materials in a thermoplastic condition or dissolved in the usual plasticisers. Water soluble salts and, in particular, the water soluble quaternary salts of the Formulae Ia and IIa are suitable for the dyeing of polymeric and copolymeric acrylonitrile, for example in the form of textile fibres, in an acid, aqueous bath. They produce yellow to orange dyeings which have relatively good fastness to light, excellent wet fastness properties and outstanding brilliance.

The following examples serve to illustrate the invention without lifting it in any way. In there examples, where not otherwise stated, parts are given as parts by weight and their relationship to parts by volume is as that of grammes to cubic centimetres. The temperatures are in degrees centigrade.

Example 1

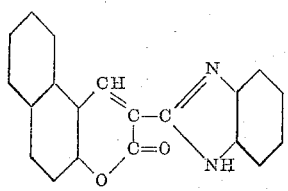

15.7 parts of 2-(cyanomethyl)-benzimidazole (Copeland R.A.B. et al., J. Am. Chem. Soc. 65, (1943) page 1072) and 17.2 parts of 2-hydroxy-1-naphthaldehyde are dissolved in 150 parts by volume of ethanol. 1 part by volume of piperidine is added all at once to the solution at 32°. The mixture becomes dark yellow without any considerable heat being generated. A sandy precipitate gradually forms from the dark mixture. After stirring for 24 hours at 25–30°, the dark precipitate is filtered off under suction and washed with ethanol until the filtrate is only faintly coloured. The α-benzimidazolyl-(2)-β-(2'-hydroxy-1'-naphthyl)-acrylonitrile obtained as a dirty yellow powder is very difficult to dissolve in all the usual solvents. To convert into the desired coumarin derivative, the methine compound obtained is refluxed in 750 parts by volume of 2% hydrochloric acid for 24 hours while stirring well. First a viscous yellow slurry is formed (hydrochloride of the 2-iminocoumarin derivative) which gradually becomes more thinly liquid. The acid reaction mixture is then cooled, the yellow precipitate is filtered off under suction, washed with a little water and dried. The hydrochloride of 3-(benzimidazolyl-2')-5.6-benzocoumarin is obtained as a yellow, difficultly soluble powder. This is suspended in hot dimethyl formamide and excess ammonia solution is added. After the addition of water or alcohol, the free base separates as a yellow precipitate. The 3-(benzimidazolyl-2')-5.6-benzocoumarin so obtained crystallises from chlorobenzene in fine yellow needles. M.P. 277°. Elementary analysis shows that the product has the formula $C_{20}H_{12}O_2N_2$.

The diluted dioxan solution of the product fluoresces vivid blue-green; the diluted hydrochloric acid solution fluoresces an intensive blue-green.

If 2.9 parts of 3-(benzimidazolyl-2')-5.6-benzocoumarin, 0.1 parts of finely divided copper phthalocyanine, 640 parts of polyvinyl chloride powder, 340 parts of dioctylphthalate (plasticiser) and 17 parts of dibutyl-tin-laurate (stabiliser) are thoroughly mixed, plasticised on hot rolls at 160° C. and extruded to foils of 0.2 mm. thickness, then the foils so obtained show a pleasant blue-green shot effect in daylight. If instead of copper phthalocyanine, 0.05 part of the azo pigment from 2 mols of diazotised 2.4-dichloraniline and 4.4'-bis-acetoacetylamino-3.3'-dimethyldiphenyl are used, foils showing a yellow-green shot effect are obtained.

If in the first paragraph of the above example, 12.2 parts of 2-hydroxybenzaldehyde, 15.2 parts of 4-methoxy-2-hydroxybenzaldehyde or 16.6 parts of 4-ethoxy-2-hydroxybenzaldehyde are used in the condensation with 15.7 parts of 2-cyanomethyl-benzimidazole and otherwise the same procedure is followed, then 3-(benzimidazolyl-2')-coumarin, 3-(benzimidazolyl-2')-7-methoxy- and -7-ethoxycoumarin are obtained which show similar fluorescent properties and may also be used to impart these properties to vinyl chloride polymers.

Example 2

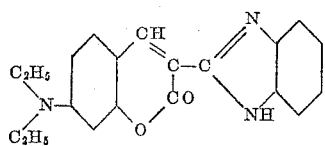

15.7 parts of 2-(cyanomethyl)-benzimidazole and 19.3 parts 4-diethylamino-2-hydroxybenzaldehyde (German Patent No. 105,103), are dissolved in 150 parts by volume of ethyl alcohol. 1 part of piperidine is added to the solution at 25° while stirring and the whole is then stirred for 24 hours at room temperature. A yellow precipitate gradually separates out of the solution. It consists of α - (benzimidazolyl - 2')-β-(2'-hydroxy-4'-diethylaminophenyl)-acrylonitrile. This methine compound crystallises from chlorobenzene in fine yellow crystals which melt at 234–235°. The product is converted into the desired coumarin derivative by dissolving it hot in 750 parts by volume of 2% hydrochloric acid and refluxing the solution for 6 hours. On adding excess sodium acetate to the yellow-red acid solution, the 3-(benzimidazolyl-2')-7-diethylamino coumarin separates out, under splitting off of ammonia, in the form of a dark yellow fine precipitate. The new coumarin compound crystallises from a mixture of chlorobenzene and benzene in light brown crystals which melt at 232–234°. Elementary analysis shows that the product has the formula $C_{20}H_{19}O_2N_3$.

The product dissolves in organic solvents such as benzene, chlorobenzene, acetone and ethyl acetate with a yellow colour and an intensive green fluorescence. This compound dyes synthetic materials made from polymeric olefines in yellow shades. For example, a solution of the substance in acetic acid dyes polyacrylonitrile textile fibres ("Orlon") in yellow shades.

A water soluble, more stable quarternary salt is obtained by the following method:

2 parts of 3-(benzimidazolyl-2')-7-diethylamino coumarin and 4 parts of dimethyl sulphate are heated for 10 minutes while stirring at 120° C. The warm reaction mixture is stirred in 500 parts of warm water. The pH value of the solution is adjusted to 6 by the addition of sodium acetate. The solution is clarified by filtration and then 15 parts of zinc chloride and 50 parts of sodium chloride are added. The product which precipitates in the form of the zinc chloride double salt is filtered off under suction and dried.

The yellow colour salt of the formula

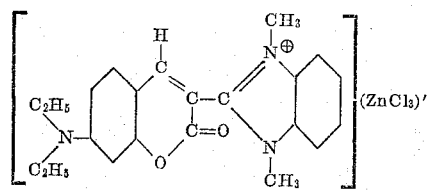

dissolves in water with a yellow colour and has an intensive green fluorescence. It dyes polyacrylonitrile fibres, for example Orlon 42 (Du Pont, Wilmington U.S.A.), in a boiling bath with the addition of the usual amounts of acetic acid, in brilliant, pure yellow shades. The dyeings have excellent wet fastness properties.

A product which dyes Orlon 42 in the same shades is obtained if, instead dimethyl sulphate, methyl iodide is reacted in a closed vessel at 120°.

Example 3

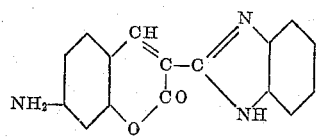

47 parts of 2-(cyanomethyl)-benzimidazole and 58 parts of 2-methoxy-4-acetylaminobenzaldehyde are dissolved in 400 parts by volume of methyl alcohol. A solution of 6 parts by volume of 50% aqueous caustic potash solution in 60 parts by volume of methyl alcohol is added to the solution at 30° while stirring. The temperature rises spontaneously to 40–45°, and the contents of the reaction vessel solidifies into a solid yellow crystal sludge. The mixture is left to stand for 2 hours at room temperature, the yellow precipitate is then filtered off, washed with ethanol and water and dried at 80° in a vacuum. In this way, α-(benzimidazolyl-2′)-β-(2′-methoxy-4′-acetylaminophenyl)-acrylonitrile is obtained as a yellow powder which melts at 250°. The acrylonitrile derivative crystallises from glacial acetic acid in yellow needles which melt at 252–253° on decomposition.

55 parts of α-(benzimidazolyl-2′)-β-(2′-methoxy-4′-acetylaminophenyl)-acrylic acid nitrile are suspended in 300 parts by volume of benzene. 85 parts of anhydrous aluminium chloride are gradually added to the suspension while stirring well and the whole is refluxed for 24 hours while stirring strongly. The reaction mixture, which consists of a lower phase of dark brown coloured, heavy, viscous aluminium complex and of a pale yellowish coloured light-fast benzene phase, is poured while stirring into a mixture of 60 parts by volume of 30% hydrochloric acid and 600 parts of ice. The mixture, which is not homogeneous, is heated on a water bath while stirring until a smooth yellow suspension is obtained. The yellow suspension is then filtered under suction, the residue is washed with water and the yellow filter cake is dried. In this manner a product which consists chiefly of the N-acetyl compound of the desired 7-aminocoumarin compound is obtained. The acetylamino group is saponified by heating the well pulverised acetyl compound in 500 parts of 85% sulphuric acid for 15 minutes at 150° while stirring. After cooling, the brown mixture is diluted with 1000 parts of ice water, the yellow precipitate (difficultly soluble acid sulphate of 3-(benzimidazolyl-2′)-aminocoumarin formed) is filtered off under suction and washed with water. The residue is distributed in 1000 parts by volume of 20% alcohol while stirring and a 25% aqueous ammonia solution is added at 60° until the yellow suspension colours brilliant paper red. After cooling, the amino compound is filtered off under suction, washed with water and dried. About 42 parts of crude 3-(benzimidazolyl-2′)-7-aminocoumarin are obtained as a dirty brown powder which has not a definite melting point (about 300°). The product is purified by recrystallising from about 8 times the amount of dimethyl formamide. In this way, fine yellow tiny crystals of the analytically pure compound are obtained. They melt at 320–325° on decomposition. This compound also dissolves in organic solvents with a yellow colour and an intensive green fluorescence and can be used for the dyeing of "Orlon" fibres (Du Pont). Dyed from an acetic acid solution, the product produces a vivid greenish-yellow dyeing on polyacrylonitrile fibres. The dyestuff is considerably more difficultly soluble in organic solvents than the diethylamino compound obtained according to Example 2.

Quaternary salts which are more suitable for dyeing purposes are obtained by the following process:

1 part of 3-(benzimidazolyl-2′)-7-aminocoumarin in 10 parts of methyl-p-toluene sulphonate is heated for 10 minutes while stirring at 140–150°. The reaction mixture is stirred into 500 parts of warm water. The pH value of the cold solution is adjusted to 6 with sodium acetate and it is then clarified by filtration. After the addition of 5 parts of zinc chloride and 50 parts of sodium chloride, the quaternary salt is precipitated, filtered off under suction and dried. It dissolves in water with an intensive green fluorescence and a yellow colour and dyes polyacrylonitrile textile fibres, for example Dralon (Farbenfabriken Bayer, Leverkusen, Germany) in pure, vivid, green-yellow shades. A similar result is obtained on using ethyl-p-toluene sulphonate. The dyestuffs have the formulae:

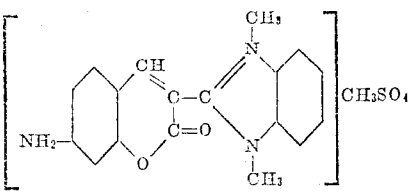

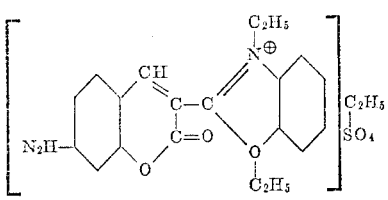

*Example 4*

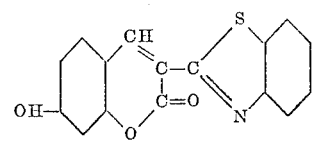

A solution of 4.68 parts of 7-hydroxycoumarin-3-carboxylic acid ethyl ester (produced by condensation of malonic acid diethyl ester and 2.4-dihydroxybenzaldehyde to close the ring) and 2.5 parts of o-aminothiophenol in a mixture of 10 parts of diphenyl and 10 parts of diphenyl ether is boiled for 5 minutes. After cooling the reaction mass to 60°, 30 parts of abs. benzene are added and the benzene is again distilled off by heating the solution slowly to 100°. The residue is boiled for another 10 minutes, cooled and then 40 parts of abs. ether are added. The precipitated yellow product is filtered off and recrystallised from a mixture of water/pyridine 1:1. 3-(benzthiazolyl-2′)-7-hydroxycoumarin is obtained in the form of yellow needles which melt at 305°. (S calculated 10.85%; S found 10.98% for $C_{16}H_9O_3N\ S$).

The compound has a blue fluorescence and can be used for the protection of polyvinyl chloride dyed with pigments by the method described in Example 1.

*Example 5*

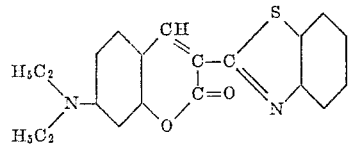

2.9 parts of 7-N-diethylaminocoumarin-3-carboxylic acid ethyl ether (produced by condensation of malonic acid diethyl ester and 4-diethylamino-2-hydroxybenzaldehyde to close the ring) and 1.25 parts of o-aminothiophenol are dissolved in 10 parts of a mixture of diphenyl and diphenyl ether and the solution is boiled for 1 hour. The reaction mass is cooled and 20 parts of ethyl alcohol are added whereupon the temperature is again raised and the ethyl alcohol is again distilled off. The reaction solution is finally refluxed for a further hour. The crude 3-(benzthiazolyl-2′)-7-diethylaminocoumarin is precipitated by the addition of the same volume of ethyl alcohol and cooling in ice. On crystallising from 75% aqueous pyridine it is obtained in the form of orange needles which melt at 204°. The sulphur determined agrees with the formula $C_{20}H_{18}O_2N_2S$.

Dissolved in polystyrene, the product obtained produces yellow dyeings which fluoresce strong green.

A quaternary salt suitable for the dyeing of polyacrylonitrile fibres is obtained as follows:

1 part of 3-(benzthiazolyl-2′)-7-diethylaminocoumarin is heated in 5 parts of dimethyl sulphate for 15 minutes at 130–140° while stirring. The red melt is extracted with 500 parts of hot water, the pH value of the solution is adjusted to 6 with sodium acetate whereupon it is cooled and clarified by filtration. On stirring in 5 parts of zinc chloride and 50 parts of sodium chloride, the orange dye salt of the formula

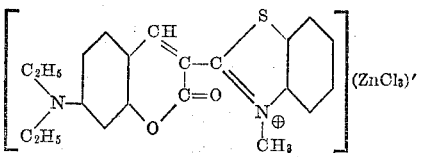

is precipitated. It is filtered off under suction and dried. It dissolves in water with a vivid orange colour and dyes polyacrylonitrile fibres, for example "Crylor" (Rhodiaceta, Lyons, France) in brilliant, extraordinarily pure orange shades. The dyeings have excellent wet fastness properties. A similar, ethylated dyestuff is obtained on using diethyl sulphate.

Example 6

5.8 parts of 7-N-diethylaminocoumarin-3-carboxylic acid ethyl ester and 2.16 parts of o-phenylene diamine are taken up in 20 parts of a mixture of diphenyl and diphenyl ether. The solution is refluxed for 2 hours, then cooled and 20 parts of ethyl alcohol are added. The ethyl alcohol is again distilled off by gradually heating the solution to 100°. The temperature is then again brought to boiling and the reaction mass is kept for another hour under reflux. The crude 3-(benzimidazolyl-2')-7-diethylaminocoumarin is precipitated by cooling and adding ethyl alcohol. On crystallising from ethyl alcohol, a product melting at 232–234° is obtained.

The acetic acid solution of this substance dyes polyacrylonitrile fibres from an acetic bath in vivid yellow shades. Dissolved in polystyrene, it produces yellow dyeings having a green fluorescence.

On treating the 3-(benzimidazolyl-2')-diethylaminocoumarin described above with excess dimethyl sulphate at a raised temperature, a water soluble yellow colour salt is obtained which is suitable for the dyeing of polyacrylonitrile fibres in an aqueous/acetic acid bath. It corresponds to the product described in Example 2.

Example 7

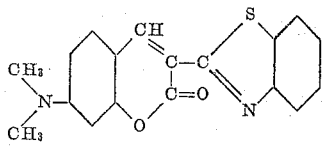

52.2 parts of 7-N-dimethylaminocoumarin-3-carboxylic acid ethyl ester (M.P. 168–169, produced by condensation of 2-hydroxy-4-dimethylamino benzaldehyde with malonic acid diethyl ester) and 27.5 parts of o-aminothiophenol are refluxed in a mixture of 50 parts of diphenyl and 50 parts of diphenyl ether in the presence of 0.5 part of boric acid for 1½ hours in a 260° hot oil bath. A sloping condenser is then fitted and the mixture is heated for another 1½ hours at the same temperature. The orange-red coloured solid reaction mixture is then purified by recrystallising from about 600 parts of dimethyl formamide. The 3 - (benzothiazolyl - 2') - 7 - dimethylaminocoumarin so obtained crystallises in yellow, flat small needles. The crystals when all together have the appearance of a red powder. M.P. 290–291°. On heating, the new coumarin derivative turned a deep red colour and on cooling the original colour returns. The product has an intensive green fluorescence in organic solvents. As with the products obtained according to Example 5, intensively fluorescent polystyrene dyeings are obtained with this compound also. Elementary analysis shows the product has the formula $C_{18}H_{14}O_2N_2S$.

In a similar manner on using 6-methyl-7-dimethylaminocoumarin-3-carboxylic acid ethyl ester (produced from 2-hydroxy-4-dimethylamino-5-methyl benzaldehyde condensed with malonic acid diethyl ester), 3-(benzthiazolyl-2')-6-methyl-7-dimethylaminocoumarin of the formula

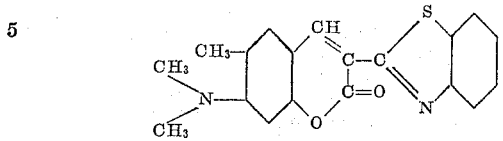

is obtained.

These compounds too can be converted into quaternary salts as follows:

The suspension of 1 part of 3-(benzthiazolyl-2')-7-dimethylaminocoumarin in 5 parts of diethyl sulphate is heated for 20 minutes at 140–150°. The dark red melt is then extracted with 500 parts of hot water, the pH is adjusted to 6 with sodium acetate, the solution is clarified by filtration and the quaternary salt is precipitated from the orange filtrate by the addition of 10 parts of zinc chloride and 50 parts of sodium chloride. The orange product is filtered off under suction and dried. The salt dissolves in water with a vivid orange colour. It dyes polyacrylonitrile fibres, e.g. Pan (Farbenfabriken Bayer, Leverkusen, Germany) in a boiling aqueous/acetic acid bath in brilliant, pure, orange shades. The dyeings have excellent wet fastness properties.

Instead of the diethyl sulphate, also a corresponding amount of ethyl-p-toluene sulphonate can be used.

The coumarin derivative described in the second paragraph can be converted in the same manner into the quaternary salt of the formula

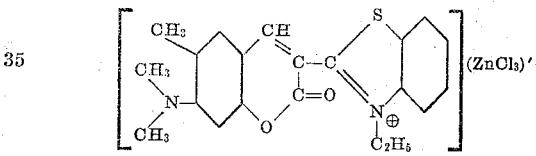

It has similar dyeing properties.

Example 8

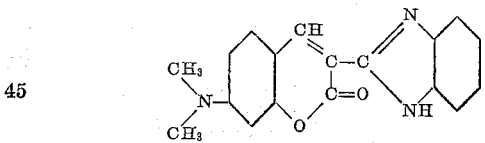

26.1 parts of 7-N-dimethylaminocoumarin-3-carboxylic acid ethyl ester, 12 parts of 1.2-diaminobenzene and 0.2 parts of boric acid in a mixture of 50 parts of diphenyl and 50 parts of diphenyl ether are heated for 3 hours at 250–260°. A dark yellow melt is formed while alcohol and steam are given off. On cooling the melt solidifies in crystalline form. The reaction mixture is boiled out in about 300 parts by volume of toluene and, after cooling, the yellow precipitate is filtered off and washed with benzene and alcohol. The 3-(benzimidazolyl-2')-7-dimethylaminocoumarin formed crystallises from chlorobenzene in yellow, longish leaflets. They melt at 329–330° and have similar properties to the diethylamino derivative described in Example 3. Elementary analysis shows that the product has the formula $C_{18}H_{15}O_2N_3$.

If in this example the 12 parts of 1.2-diaminobenzene are replaced by 13 parts of 4-methyl-1.2-diaminobenzene, then 3 - (5' - methylbenzimidazolyl-2')-7-dimethylaminocoumarin of the formula

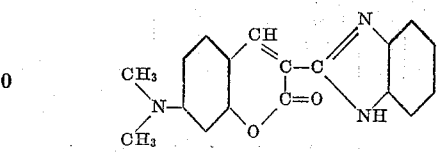

is obtained. It melts at 336° and has similar properties to the product mentioned above. This product crystallises from dimethyl formamide in small, yellow, flat prisms. Elementary analysis shows that the product has the formula $C_{19}H_{17}O_2N_3$.

3 - (1' - methylbenzimidazolyl-2')-7-diethylaminocoumarin is obtained under similar conditions from 2.9 parts of 7-N-diethylaminocoumarin-3-carboxylic acid ethyl ester and 1.4 parts of 1-methylamino-2-aminobenzene. Recrystallised from benzene it is a yellow crystal powder which melts at 213–214°. In a benzene solution, this compound also fluoresces green to blue-green and in strongly diluted ligroin solution the product has a greenish blue fluorescence. Elementary analysis shows that it has the formula $C_{21}H_{21}O_2N_3$ and the structural formula

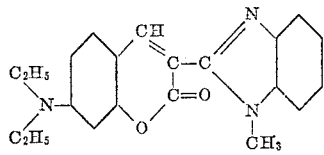

If instead of the 2.9 parts of 7-N-diethylaminocoumarin-3-carboxylic acid ethyl ester, 2.6 parts of 7-N-dimethylaminocoumarin-3-carboxylic acid ethyl ester are used for the condensation with 1.4 parts of 1-methylamino-2-benzene, and the same procedure described in the first paragraph is followed, then 3-(1'-methylbenzimidazolyl-2')-7-dimethylaminocoumarin of the formula

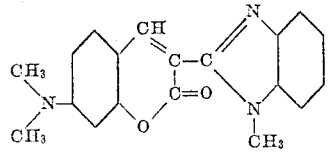

are obtained. The product is obtained in the form of yellowish needles which melt at 233° and it has similar properties to that described above. Elementary analysis shows that it has the formula $C_{19}H_{17}O_2N_3$.

Also, if 6.5 parts of 7-N-dimethylaminocoumarin-3-carboxylic acid ethyl ester are condensed through a sloping condenser as described in the first paragraph of this example with 3.7 parts of N-ethyl-o-phenylene diamine in 5 parts of diphenyl ether and 0.05 parts of boric acid, the condensation being performed for 3 hours in a 250–260° oil bath, then a yellow melt is obtained. If this melt is mixed with benzene, the yellow precipitate is filtered off and washed with alcohol and water, after drying for a short time and recrystallising from toluene, yellow needles which melt at 210° are obtained. This product dissolves in organic solvents with a yellow colour and, in ultraviolet light, has a weak blueish fluorescence. Analysis shows that it is not the desired benzimadazole derivative but the N-ethyl-N'-(7-dimethylaminocoumarin-oyl-3)-o-phenylene diamine.

*Analysis.*—N, found 11.70%, N, calculated 11.96% $C_{20}H_{21}O_3N_3$.

If this coumarin carboxylic acid amide is refluxed for 2 hours with 30% hydrochloric acid, then on neutralising the hydrochloric acid solution with ammonia, the 3-(1'-ethylbenzimidazolyl-2')-7-dimethylaminocoumarin precipitates. It is obtained in the form of short yellow needles on recrystallising from chlorobenzene/ligroin. M.P. 222°. The product dissolves in hot alcohol with a yellow colour and a green fluorescence. Elementary analysis shows that it has the formula $C_{20}H_{19}O_2N_3$ and the structural formula

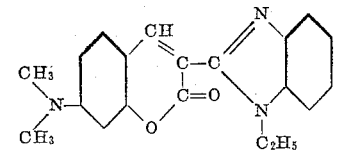

If, finally, 2.9 parts of 7-N-diethylaminocoumarin-3-carboxylic acid ethyl ester are condensed under the same conditions with 1.4 parts of 4-methyl-1.2-diaminobenzene, then after recrystallization from alcohol, 3-(5'-methyl-benzimidazolyl-2')-7-diethylaminocoumarin is obtained in the form of yellow crystals which melt at 235°. Elementary analysis shows that it has the formula $$C_{21}H_{21}O_2N_3$$

and the structural formula

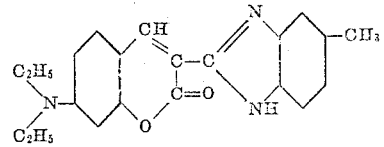

The product has properties similar to those of the compound obtained according to Example 2.

These new 3 - (benzimidazolyl-2') - 7 - dialkylaminocoumarins can be converted under the conditions which have been described in previous examples, for example with dimethyl sulphate or with methyl-p-toluene sulphonate, into the quaternary salts; for example the product described immediately above can be converted into the quaternary salt of the formula

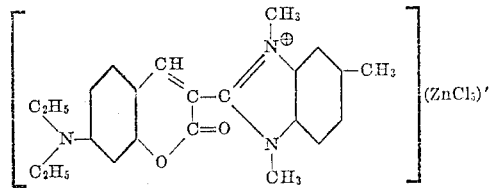

This reaction is performed particularly easily with those coumarins which contain a 1'-alkl-benzimidazolyl-(2')-radical in the 3-position. The process, for example, is as follows:

3.5 parts of 3-(1'-methylbenzimidazolyl-2')-7-diethyl-aminocourmarin (see the third formula of this example) are heated for 30 minutes at 110–120° with 1.3 parts of dimethyl sulphate in 150 parts of boiling chlorobenzene. On cooling the solution, the quaternary dye salt precipitates in the form of fine yellow crystals. To purify, these crystals are dissolved in 200 parts of warm water. The solution is clarified by the addition of a little kieselguhr and is then stirred with 3 parts of zinc chloride and 20 parts of sodium chloride. The quaternary salt described in Example 2 precipitates.

The N-methyl cyclammonium salts are obtained analogously from 3-(1'-methyl- or -(1'-ethyl- benzimidazolyl-2') - dimethylaminocoumarin (see the fourth and fifth formulae of this example), and, with the corresponding amount of benzyl bromide, the N-benzyl cyclammonium salts of the formula

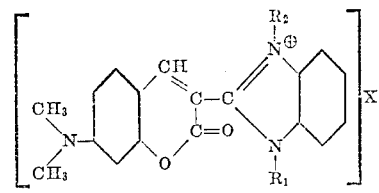

are obtained wherein $R_1$ represents either methyl or ethyl and $R_2$ represents either methyl or benzyl and X represents a chlorine ion or bromine ion, a methosulphate ion or $(ZnCl_3)'$.

On boiling for 1 hour in an aqueous dyebath, all these quaternary salts produce, when dyed in the usual contents percent in a liquor ratio of 1:30–1:50 with the addition of 0.5–3% of acetic acid, vivid, yellow, wet-fast dyeings on Orlon (Du Pont), Pan (Bayer) or Crylon (Rhodiaceta).

In an analogous manner on starting from 7-dipropylamino-, 7-dibutylamino-, 7-ethylbenzylamino-, 7-phenylethylamino- coumarin-3-carboxylic acid ethyl ester, by reacting with 1.2-diaminobenzene, 1-methyl- or 1-ethylamino-2-aminobenzene and ethylating, the corresponding dye salts are obtained which also dye polyacrylonitrile fibres in vivid yellow shades.

*Example 9*

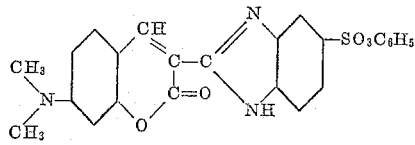

26.1 parts of 7-N-dimethylaminocoumarin-3-carboxylic acid ethyl ester, 26.5 parts of 1.2-diaminobenzene-4-sulphonic acid phenyl ester (M.P. 110–111°) and 0.2 parts of boric acid, in a mixture of 50 parts of diphenyl and 50 parts of diphenyl ether, are condensed through a sloping condenser in a 250–260° oil bath for 3 hours. After cooling, the mixture obtained is diluted with benzene. The yellow precipitate is filtered off and purified by recrystallisation from dimethyl formamide.

The product obtained, the phenyl ester of 3-(5'-sulphobenzimidazolyl-2')-7-dimethylaminocoumarin, forms an orange yellow powder consisting of fine yellow leaflets which melt at 307–308°. In rather high dimethyl formamide dilution it fluoresces an intensive yellow-green to green. The phenylester group can be saponified by heating with alkali carbonate in ethylene glycol and a yellow, water soluble alkali metal salt of the corresponding sulphonic acid is obtained. The phenyl ester can be used for the dyeing of synthetic materials. Elementary analysis shows that it has the formula $C_{24}H_{19}O_5N_3S$.

If in this example, the 26.5 parts of 1.2 - diaminobenzene-4-sulphonic acid phenyl ester are replaced by 21.5 parts of 1.2 - diaminobenzene - 4 - sulphonic acid dimethylamide (M.P. 204–205°) or by 18.6 parts of 1-2-diaminobenzene-4-methyl sulphone (M.P. 162–163°) then the dimethylamide of 3-(5'-sulphobenzimidazolyl-2')-7-dimethylaminocoumarin or the 3-(5'-methyl sulphonyl - benzimidazolyl-2')7-dimethylaminocoumarin is obtained. The former product crystallises from dimethyl formamide in yellow crystals which melt at 332–333° and the latter crystallises in deep yellow crystals which melt at 299–301°. These two products also fluoresce in dimethyl formamide solution an intensive green.

By reacting with dimethyl sulphate under the conditions described in Example 2, the water soluble quaternary salts of the formula

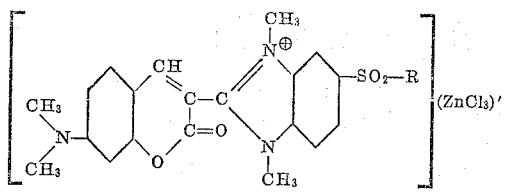

are obtained, wherein R represents either the phenoxy, the dimethylamino or the methyl radical.

All these salts dye textile fibres made up from polymeric or copolymeric acrylonitrile in a boiling acetic acid bath in vivid yellow shades.

*Example 10*

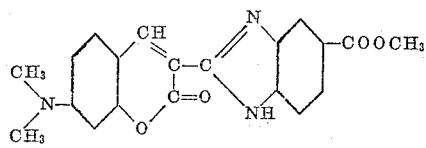

1.85 parts of 7-N-dimethylaminocoumarin-3-carboxylic acid ethyl ester are condensed through a sloping condenser with 1.5 parts of 3.4-diaminobenzene-1-carboxylic acid methyl ester (M.P. 108–110°) and 0.02 part of boric acid in a mixture of 2.5 parts of diphenyl and 2.5 parts of diphenyl ether, the condensation being performed for 3 hours at 240–250°. The yellow, semi-solid reaction mixture is boiled out with 25 parts by volume of chlorobenzene, after cooling, the yellow precipitate is filtered off and purified by recrystallisation from dimethyl formamide. The 3-(5'-carbomethoxybenzimidazolyl-2')-7-dimethylaminocoumarin so obtained, a yellow powder which melts at 316–317°, dissolves in hot chlorobenzene with a yellow colour and a vivid green fluorescence. This coumarin derivative also can be used for the dyeing of polystyrene materials. Elementary analysis shows that it has the formula $C_{20}H_{17}O_4N_3$.

If this product is alkylated corresponding to the method given in Example 2, then the yellow dye salt of the formula

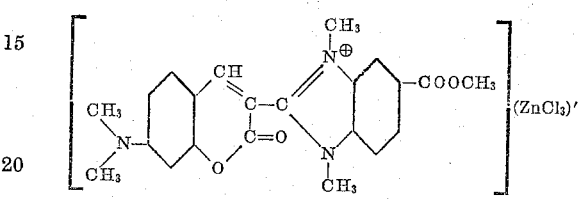

is obtained. It dyes polyacrylonitrile fibres a vivid yellow colour.

*Example 11*

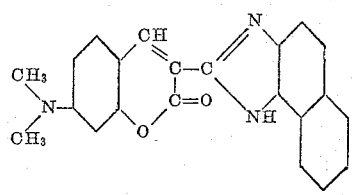

2.61 parts of 7-N-dimethylaminocoumarin-3-carboxylic acid ethyl ester, 1.6 parts of 1.2-diaminonaphthalene and 0.05 part of boric acid in a mixture of 2.5 parts of diphenyl and 2.5 parts of diphenyl ether are heated for 3 hours in a 250–260° oil bath, the alcohol and/or water split off being continually distilled off. The dark melt obtained is first liberated from side products by treatment with warm chlorobenzene and then the red-brown powder obtained is purified by recrystallisation from dimethyl formamide. The desired 3-(naphthimidazolyl-2')-7-dimethylaminocoumarin is so obtained as a red crystal powder which melts at 317–318°. The product dissolves in dimethyl formamide with a yellow colour and an intensive, vivid green fluorescence. Elementary analysis of the compound shows it has the formula $C_{22}H_{17}O_2N_3$.

If in this example the 2.61 parts of 7-N-dimethylaminocoumarin-3-carboxylic acid ethyl ester are replaced by 2.89 parts of 7-N-diethylaminocoumarin-3-carboxylic acid ethyl ester, then 3-(naphthimidazolyl-2')-7-diethylaminocoumarin which melts at 254–255° is obtained. It is somewhat more easily soluble in organic solvents. In organic solution, this product also has an intensive green to yellow green fluorescence and can be used for the dyeing of synthetic materials.

If this coumarin derivative is reacted by the method described in Example 3 with methyl-p-toluene sulphonate, then a pale yellow dye salt of the formula

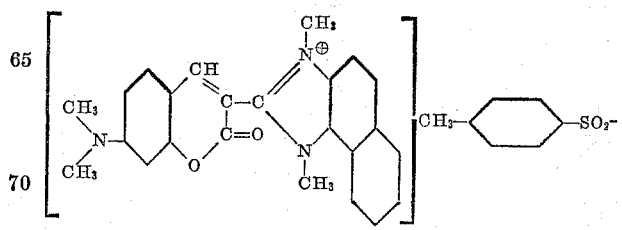

is obtained which dyes polymeric and copolymeric acrylonitrile textile fibres in a boiling aqueous bath containing a little acetic acid in vivid yellow shades.

Example 12

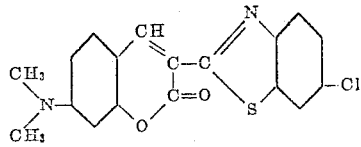

20 parts of 5-chloro-2-aminothiophenol hydrochloride and 26.1 parts of 7-N-dimethylaminocoumarin-3-carboxylic acid ethyl ester in a mixture of 50 parts of diphenyl and 50 parts of diphenyl ether are condensed through a sloping condenser in a nitrogen atmosphere for 3 hours at 210°. Hydrogen chloride, alcohol and water are split off and a dark red melt is formed. The same amount by volume of dimethyl formamide is added to the reaction mixture obtained at 140–150° and the whole is cooled. After the addition of 50 parts by volume of methanol, the orange coloured precipitate is filtered off, washed well with alcohol and then purified by recrystallising from chlorobenzene or dimethyl formamide. The 3-(6'-chlorobenzthiazolyl-2')-7-dimethylaminocoumarin (M.P. 293–294°) crystallises from chlorobenzene in yellow leaflets and from dimethyl formamide in dark yellow little needles. On heating the colour becomes much darker. The product dissolves in hot chlorobenzene with a strong yellow colour and an intensive, yello-green fluorescence. The new compound can be used for the dyeing of synthetic materials. Elementary analysis shows it has the formula $C_{18}H_{13}O_2N_2SCl$.

If in this example, the 26.1 parts of 7-N-dimethylaminocoumarin-3-carboxylic acid ethyl ester is replaced by 28.9 parts of 7-N-diethylaminocoumarin carboxylic acid ethyl ester, then 3-(6'-chlorobenzthiazolyl-2')-7-diethylaminocoumarin is obtained as an orange coloured crystal powder which melts at 197–199°. It is considerably better soluble in organic solvents. This product also can be used for the dyeing of synthetic materials.

The dye salts obtained by alkylating by the method described in Example 5 of the formula

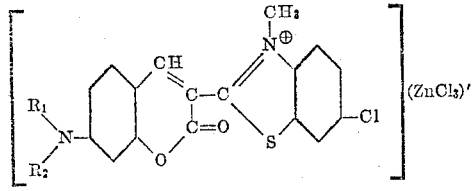

wherein $R_1$ and $R_2$ represent either methyl or ethyl, dye polymeric or copolymeric acrylonitrile textile fibres from an aqueous dyebath with the addition of a little acetic acid, on boiling, in extraordinarily vivid reddish orange shades. The dyeings have excellent wet fastness properties.

Example 13

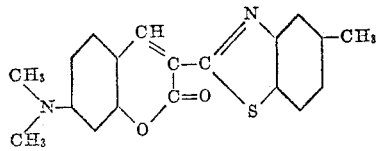

2.61 parts of 7-N-dimethylaminocoumarin-3-carboxylic acid ethyl ester and 1.90 parts of the zinc salt of 4-methyl-2-aminothiophenol are mixed with 0.7 part of boric acid and condensed through a sloping condenser in a mixture of 5 parts of diphenyl and 5 parts of diphenyl ether in a 250–260° oil bath for 3 hours. After cooling, the orange-red reaction mixture is mixed with 25 parts of benzene and the orange-red dyestuff is filtered off. It is washed with alcohol and diluted acetic acid and, after a short drying, is recrystallised from chlorobenzene. The 3-(5'-methylbenzthiazolyl-2')-7-dimethylaminocoumarin desired is obtained in the form of dark yellow needles which melt at 288°. The new benzthiazole derivative dissolves in hot chlorobenzene with a yellow colour and has an intensive yellow-green fluorescence. The product can be used for the dyeing of forms of polystyrene in vivid orange shades. It has the elementary analysis $C_{19}H_{16}O_2N_2S$.

If this compound is methylated under the conditions given in Example 5, then the dye salt of the formula

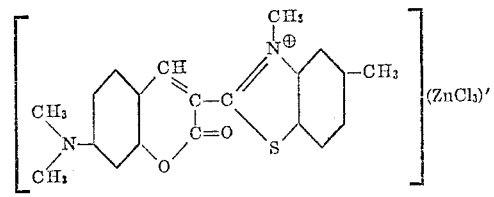

is obtained.

The water soluble salt dyes polymeric or copolymeric acrylonitrile textile fibres from a boiling aqeous bath in the presence of the usual amounts of acid, for example 0.5–3% of acetic acid, in extremely vivid orange shades. The dyeings are excellently wet fast.

Example 14

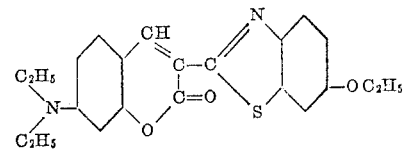

6 parts of 6-(ethoxybenzthiazolyl-2')-acetic acid benzylamide and 3.5 parts of 4-diethylamino-2-hydroxybenzaldehyde, 50 parts of ethanol and 5 parts of piperidine are refluxed for 1 hour whereupon a crystalline precipitate is formed. The precipitate is filtered off under suction and recrystallised from chlorobenzene. Fine, orange leaflets which melt at 220–221° are obtained. The product has the formula $C_{22}H_{22}O_3N_2S$.

If this coumarin derivative is methylated by the method described in Example 5, then the water soluble quaternary dye salt of the formula

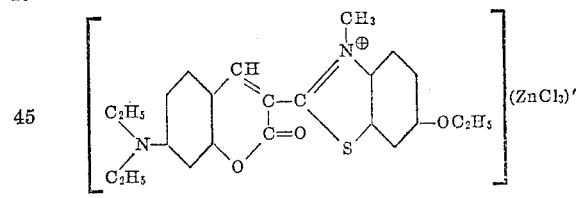

is obtained which dyes polymeric or copolymeric acrylonitrile textile fibres from a boiling acetic acid bath in vivid reddish orange shades. The dyeings are distinguished by the extraordinary purity of shade and excellent wet fastness properties.

Example 15

100 parts of polyacrylonitrile fibres (Orlon 42, Du Pont, Wilmington U.S.A.) are entered at 40° into a dyebath which contains 2 parts of 3-(1',3'-dimethylbenzimidazolimino-2')-7-diethylaminocoumarin hydrochloride-zinc chloride double salt (quaternary salt of Example 2), 10 parts of Glauber's salt, 2 parts of the sodium salt of the formaldehyde condensation product of naphthalene sulphonic acid, and 3% of 40% acetic acid dissolved in 3000 parts of water. The bath is brought to the boil within 30 minutes and dyeing is performed in a boiling bath at 96–100° for 1 hour. An extremely pure, vivid, greenish yellow dyeing which has excellent fastness properties is obtained. The bath is well exhausted.

Also the other quaternary dye salts mentioned in the examples can be used according to the same method for the production of polyacrylonitrile dyeings which are distinguished by vivid, pure yellow, orange to red-orange shades. Advantageously up to at most 4% of dyestuff, calculated on the weight of the fibres, is used.

What we claim is:

1. A member selected from the group consisting of compounds of the formulae

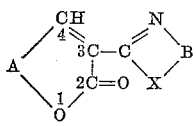

and

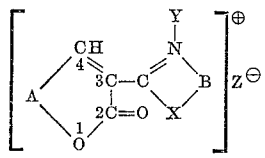

wherein the radicals A and B are bound at adjacent ring carbon atoms; A is a radical selected from the group consisting of naphthylene of the configuration

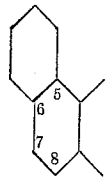

phenylene, 7-hydroxyphenylene, 7-lower alkoxyphenylene, 7-aminophenylene, 7-di(lower)alkylaminophenylene and 7-(N-phenyl-N-ethyl-N-benzylamino)phenylene and 7-(N-phenyl-N-ethyl-N-benzylamino)phenylene and 7-(N-phenyl-N-ethylamino)phenylene: X is a member selected from the group consisting of —S—, —NH— and =N— lower alkyl; B is a radical selected from the group consisting of phenylene, tolylene, phenoxysulfonylphenylene, dimethylsulfamylphenylene, methylsulfonylphenylene, carbo-(lower)alkoxyphenylene, chlorophenylene, ethoxyphenylene and naphthylene of the configuration

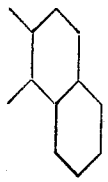

Y is a member selected from the group consisting of lower alkyl and benzyl; and Z is an anion.

2. The compound of the formula

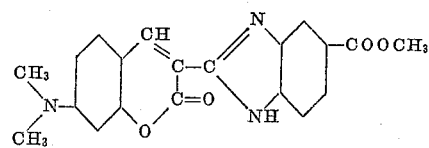

3. The compound of the formula

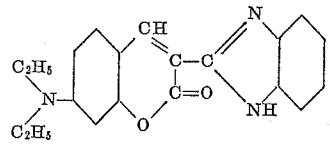

4. The compound of the formula

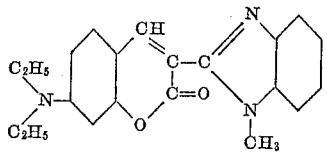

5. The compound of the formula

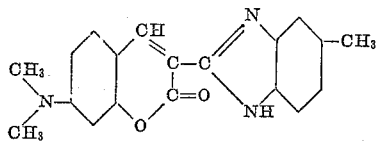

6. The compound of the formula

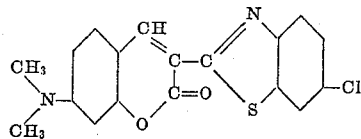

References Cited in the file of this patent

Koelsch, J. Am. Chem. Soc., vol. 72, pp. 2993–5 (1950).